United States Patent [19]

Hirozawa et al.

[11] Patent Number: 5,266,228

[45] Date of Patent: *Nov. 30, 1993

[54] CORROSION-INHIBITING AUTOMOTIVE COOLANT SOLUTIONS CONTAINING EFFECTIVE AMOUNTS OF SODIUM SILICATE HAVING A LOW RATIO OF SILICA TO SODIUM OXIDE

[75] Inventors: Stanley T. Hirozawa, Bloomfield Hills; David E. Turcotte, Woodhaven, both of Mich.

[73] Assignee: BASF Corporation, Parsippany, N.J.

[*] Notice: The portion of the term of this patent subsequent to Nov. 16, 2010 has been disclaimed.

[21] Appl. No.: 751,908

[22] Filed: Aug. 29, 1991

[51] Int. Cl.$^5$ .................... C09K 5/00; F28F 23/00
[52] U.S. Cl. .................... 252/71; 252/75; 252/389.3; 422/14; 422/18
[58] Field of Search ............ 252/74, 75, 78.3, 389.3, 252/71; 422/7, 14, 18

[56] References Cited

U.S. PATENT DOCUMENTS

| | | | |
|---|---|---|---|
| 2,961,291 | 11/1960 | Pickett et al. | 422/14 |
| 2,961,292 | 11/1960 | Pickett et al. | 422/16 |
| 3,312,622 | 4/1967 | Pines et al. | 252/75 |
| 3,340,001 | 9/1967 | Thornhill | 252/389.3 |
| 3,977,893 | 8/1976 | Wason | 423/335 |
| 4,149,985 | 4/1979 | Wilson | 252/74 |
| 4,241,014 | 12/1980 | Hirozawa et al. | 252/73 |
| 4,374,743 | 2/1983 | Stockel | 264/117 |
| 4,404,114 | 9/1983 | Mohr et al. | 252/75 |
| 4,426,309 | 1/1984 | Abel et al. | 252/74 |
| 4,457,852 | 7/1984 | Bosen | 252/78.3 |
| 4,460,478 | 7/1984 | Mohr et al. | 252/75 |
| 4,676,919 | 6/1987 | Zientek | 252/75 |
| 4,759,864 | 7/1988 | Van Neste et al. | 252/75 |

OTHER PUBLICATIONS

Hirozawa et al, "Use of Electrochemical Noise in the Study of Inhibitor Systems", Electrochem. Impedance of Practical Corrosion Predictions (Nov. 5, 1991).
R. K. Iler, "The Chemistry of Silica", pp. 375-376 (1979).
S. T. Hirozawa, "Study of the Mechanism for the Inhibition of Localized Corrosion of Aluminum by Galvanostaircase Polarization", Corrosion Inhibition, NACE, pp. 105-112 (1988).
Epelboin et al, "Use of Impedance Measurements for the Determination of the Instant Rate of Metal Corrosion", J. Appl. Electrochem., vol. 2, pp. 71-79 (1972).
Mansfield, "Recording and Anaylsis of AC Impedance Data for Corrosion Studies", Corrosion Science, vol. 36, No. 5, pp. 301-307 (1981).
Mansfield, "Recording and Analysis of AC Impedance Data for Corrosion Studies", Corrosion Science, vol. 38, No. 11, pp. 570-580 (1982).
Lorenz et al, "Determination of Corrosion Rates by Electrochemical DC and AC Methods", Corrosion Science, vol. 21, pp. 647-672 (1981).
Boukamp, "Non-Linear Least Squares Fit Analysis of AC-Impedance Measurements", Electrochem. Soc., pp. 146-151 (1985).
ASTM Standard G100, ASTM Book of Standards, vol. 3.02, pp. 384-387, 1989.
Hirozawa, Silver/Silver Sulfide Reference Electrode (1991).
Koch et al, "The AC Electrical Impedance of a Fractal Boundary to an Electrolytic Solution", J. Electrochem. Soc. vol. 138, No. 2, pp. 475-484 (1991).

Primary Examiner—Christine Skane
Attorney, Agent, or Firm—Nixon & Vanderhye

[57] ABSTRACT

Non-corrosive anti-freeze solutions for automotive cooling systems include an anti-corrosive effective amount of a sodium silicate corrosion inhibitor. The sodium silicate has an unusually low ratio of silica to sodium oxide of greater than 1.0 to about 2.5. This relatively low ratio of silica to sodium oxide prevents gelation from occurring while maintaining maximum anti-corrosive effectiveness of alcohol-based solutions containing the same.

8 Claims, 2 Drawing Sheets

5,266,228

CORROSION-INHIBITING AUTOMOTIVE COOLANT SOLUTIONS CONTAINING EFFECTIVE AMOUNTS OF SODIUM SILICATE HAVING A LOW RATIO OF SILICA TO SODIUM OXIDE

FIELD OF INVENTION

The present invention generally relates to coolant solutions used in automotive cooling systems. More specifically, the present invention relates to coolant solutions which inhibit corrosion in automotive cooling systems.

BACKGROUND AND SUMMARY OF THE INVENTION

Concentrated alcohol-based solutions are conventionally added to water in automotive cooling systems so as to provide anti-freeze protection. These water/alcohol heat transfer fluids are further inhibited from attack on the metal forming the automotive cooling systems by numerous corrosion-inhibiting additives.

The use of inorganic sodium silicates as corrosion-inhibiting agents is well known. However, sodium silicates tend to gel when used in corrosion-inhibiting effective amounts in alcohol-based coolant solutions. This "gelation" of the corrosion-inhibiting inorganic sodium silicates is problematic since the corrosion-inhibiting effectiveness of the silicate is detrimentally affected. The art has thus attempted to solve the gelation problem by various additives which serve to counteract the tendency of inorganic sodium silicates to gel in alcohol-based antifreeze solutions as evidenced, for example, by U.S. Pat. Nos. 4,149,985, 4,457,852 and 4,44460,478.

The present invention is directed to minimizing (if not eliminating entirely) the tendency of inorganic sodium silicates to gel in alcohol-based antifreeze solutions while simultaneously offering maximum corrosion-inhibiting effectiveness. Broadly, therefore, the present invention is directed to novel anti-corrosion coolant solutions for automotive cooling systems which include a synergistic corrosion-inhibiting effective amount of a sodium silicate having an unusually low ratio of silica to sodium oxide. More specifically, the present invention is directed to alcohol-based liquid solutions for automotive cooling systems which include an anti-corrosive effective amount of (i) a sodium silicate corrosion inhibitor having a ratio of silica ($SiO_2$) to sodium oxide ($Na_2O$) of greater than 1.0 to about 2.5 (preferably between about 1.8 and 2.2).

The sodium silicate is typically employed in the alcohol-based liquid coolant system solutions of this invention in an amount sufficient to yield between about 0.01 to 0.2 wt. % silica (more preferably between 0.05 to about 0.06 wt. % silica) based on the total weight of the liquid solution.

The solutions according to the present invention may contain other additives conventionally employed in anti-freeze concentrates. For example, inorganic salts (e.g., sodium phosphate) may be employed in minor amounts up to about 1.5 wt. % based on the total solution weight.

While not wishing to be bound by particular theories, it is believed that by controlling the R value, it is also possible to reduce the corrosion of aluminum. By varying the $SiO_2$ to $Na_2O$ ratio (R), the corrosion rate is significantly minimized at an R of greater than about 1.0 to about 2.5, and most preferably about 1.8 to about 2.2.

Commercial antifreeze/coolants generally have polarization resistance ($R_p$) values in the range of about $10^5$ to $10^6$ Ohms/cm$^2$. The degree of polymerization of silicate may be a function R. Aqueous silicate structure theory has been discussed in Iler, *The Chemistry of Silica,* Chapter 2, John Wiley & Sons, N.Y., 1979, hereby incorporated by reference.

At 1.0 R, the silicate of N=1 is essentially monomeric. The monomer provides very little corrosion protection. At 2.0 R, a silicate dimer may exist (N=2). At R values above 1.0 and below 2.0, a mixture of monomers and dimers may exist. This species forms a particularly stable film.

At an R value of above 2.3 to about 3.0, the N value is 15. It is believed that a geodesic sphere containing $SiO_2$ groups forms. This geodesic sphere is a weak inhibitor.

Further aspects and advantages of this invention will become clearer after careful consideration is given to the detailed description of the preferred exemplary embodiments thereof which follows.

DETAILED DESCRIPTION OF THE PREFERRED EMBODIMENTS

Figure 1:
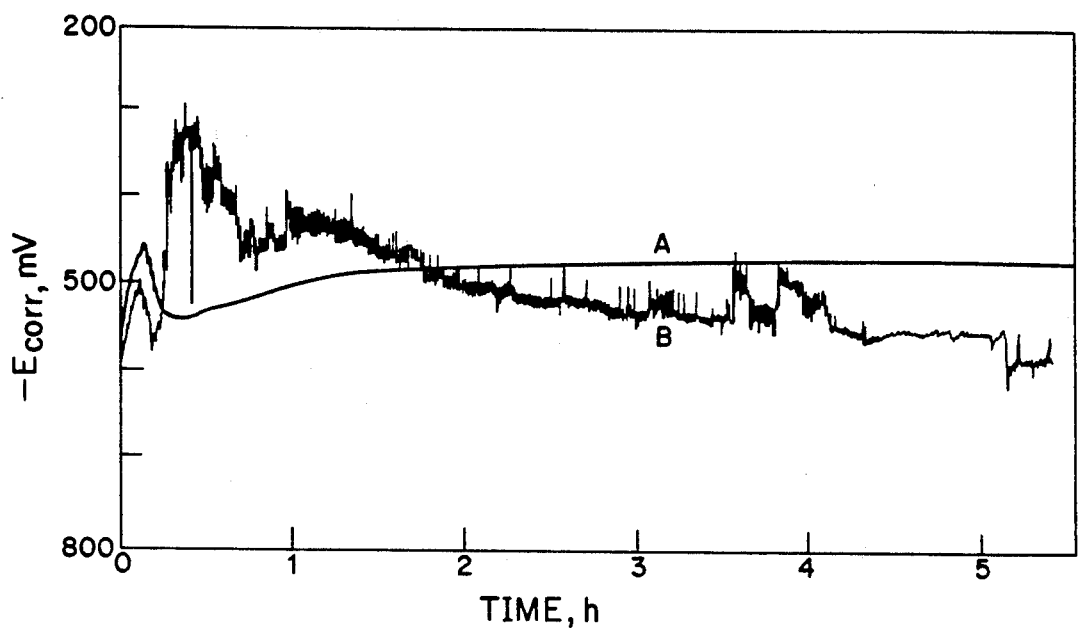
FIG. 1 is a plot of the corrosion potential ($E_{corr}$) data versus time for silicate solutions having a $SiO_2$ to $Na_2O$ ratio of 2.0 (curve A) and a $SiO_2$ to $Na_2O$ ratio of 2.5 (curve B).

The present invention will become clearer after careful consideration is given to the following nonlimiting examples.

The present invention discloses a critical $SiO_2$ to $Na_2O$ ratio (R) of about 1.0 to about 2.5 which has a significant influence on the reaction of a silicate with aluminum.

A good inhibitor system for aluminum must be able to maintain the $Al_2O_3$ inner barrier layer and also form a tough outer layer that can withstand depassivating processes. Silicate forms a tough outer layer but the toughness appears to be dependent upon the ratio (R) value. The above-described silica to sodium oxide ratio appears to lay down protective films which appear to prevent the penetration of the oxide layer by chloride.

Corrosion potential ($E_{corr}$) measurements and electrochemical impedance spectra (EIS) were used to study the silicate in the inhibition of aluminum. It has been found that silicate alone protects aluminum. Especially at unusually low ratios of silica to sodium oxide of between about 1.8 to 2.2, the protection was greatly enhanced as evidenced by the reduction of noise and the elevation of both $E_{corr}$ and the polarization resistance ($R_p$).

While not wishing to be bound by any particular theory, it is believed that unstable protective films are probably the cause of electrochemical noise. Thus, it follows that the elimination of or reduction of noise would indicate improvement in the protectiveness of a film. Therefore, noise reduction in the $E_{corr}$ versus time plot shown in FIG. 1 and EIS complements the elevation of $E_{corr}$ R as a tool in the improvement of inhibitor interaction with metal surfaces.

Generally, silicates are manufactured by fusing silica with sodium carbonate using a silica to sodium oxide ratio (w/w) of about 3.2. This product is referred to as 3.2 R silicate. The 3.2 R glass is treated with appropriate amounts of caustic and dissolved in water to make the other silicates: 1.0 R, 1.8 R, 2.5 R and 3.2 R. The manufacture of lower ratio glasses is avoided because the high caustic content wears down the fusing vessels although 2.0 R glass may be prepared to be converted to 1.0 R.

In the examples which follow, reagent grade sodium chloride and sodium metasilicate (having a ratio of $SiO_2$ to $Na_2O$ of 1.0, and henceforth referenced as "1.0 R") were used. The silicate with a $SiO_2/Na_2O$ ratio of 1.8 was obtained commercially as a specially filtered solution containing 24.1% $SiO_2$ and 13.4% $Na_2O$ (referenced henceforth as "1.8 R").

Distilled water was employed to prepare all solutions, it being understood that, in practice, the corrosion inhibitors will be employed in an alcohol-based (e.g., ethylene glycol or propylene glycol) liquid concentrate solution which is then added by the consumer to the water in an automotive coolant system to achieve approximately a 50/50 blend of water and glycol so as to provide anti-freeze protection.

In this connection, although the solutions that were tested were non-alcoholic aqueous solutions, the data is expected to be applicable to 50/50 alcohol/water solutions as well. The solutions that were evaluated in the following examples also contained 100 ppm of sodium chloride so as to enhance localized corrosion. That is, the sodium chloride was present in the solutions so as to evaluate the respective efficacy of the various additives in overcoming the corrosive aggressiveness of the chloride ion.

Keithley Model 616 and 614 digital electrometers were used to measure the corrosion potentials which were recorded on a two channel Houston Instrument recorder. For electrochemical impedance spectroscopy (EIS), a Solartron 1255 frequency analyzer/EG&G PARC Model 273 Potentiostat/Galvanostat combination was used. The experiments were conducted using EG&G PARC Model 388 software and the modeling and graphics were carried out using Boukamp software as described in B. A. Boukamp, "Non-linear Least Squares Fit of AC-Impedance Measurements", *Computer Aided Acquisition and Analysis of Corrosion Date,* Electrochem. Soc., 146 (1985), hereby incorporated by reference).

The test cells consisted of a 500 ml flat-bottomed beaker as described in S. T. Hirozawa, "Study of the Mechanism for the Inhibition of Localized Corrosion of Aluminum by Galvanostaircase Polarization", *Corrosion Inhibition.* NACE, pp. 105-112 (1988) and F. Mansfeld, *Corrosion,* 36, 301 (1981) (both of which are expressly incorporated hereinto by reference), with the exception being that the silver/silver polysulfide reference electrode was substituted for the SCE. The working electrode was 3003-H14 (UNS A93003) aluminum in sheet form whereas the counter electrode was a pair of ultrafine graphite rods. Circles having diameters of 1.5 cm were cut and prepared according to ASTM Practice G1 using 600 grit diamond slurry on a flat lapping machine by Metals Samples and used without further preparation. The specimens were mounted in flat specimen holders.

The solutions were prepared in the cell and attached to the cell cover which had provisions for the electrodes and a thermocouple. Data recording began after the positive lead of the electrometer was connected to the working electrode, and the negative lead was connected to the reference electrode. The solution was continually stirred and heated until the solution temperature stabilized at 82.2° C. (180° F.) for fifteen (15) minutes (thereby simulating the temperature of an automotive coolant system), after which stirring was discontinued. The EI Spectra evaluation was begun 5.5 hours after the solution heater was turned on.

EXAMPLE 1

A plot of $E_{corr}$ vs. time was prepared from the $E_{corr}$ data at 82.2° C. using the above procedures and appears as accompanying FIG. 1. As shown, the ratio of the 2.O R solution significantly reduced noise (curve A) as compared to the 2.5 R solution (curve B). In addition, it will be observed that the $E_{corr}$ data in FIG. 1 for the 2.O R solution was significantly elevated over the $E_{corr}$ data for the 2.5 R solution thereby indicating greater corrosion-inhibiting effectiveness.

Electrical Impedance Spectra (EIS) were obtained for various R values. From these spectra the polarization resistance ($R_p$) was determined. The corrosion rate varies inversely with $R_p$; thus, the larger the $R_p$ value, the lower the corrosion rate.

Figure 2:
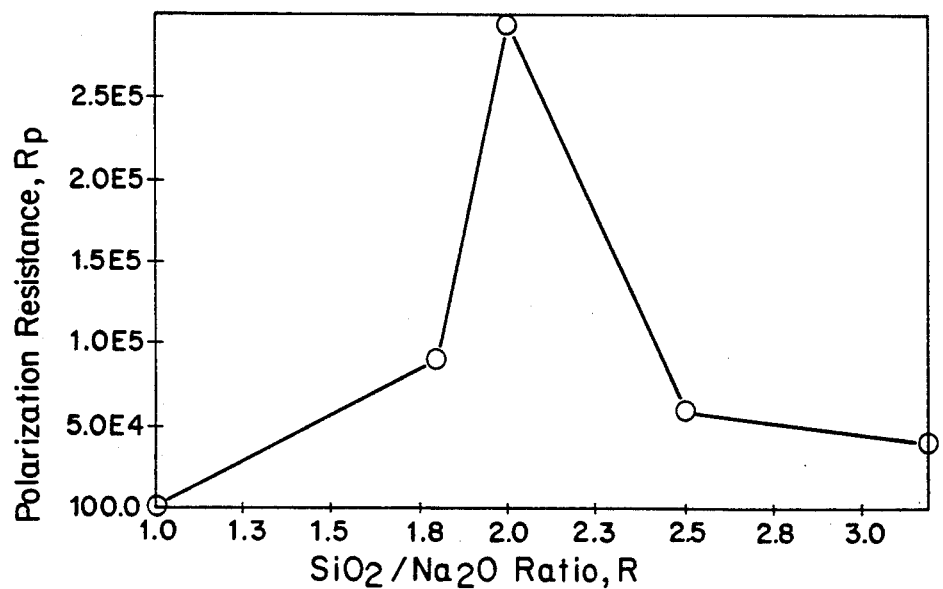
FIG. 2 is a plot of polarization resistance data versus R values for silicate solutions having a $SiO_2$ to $Na_2O$ ratio range of 1.0 to 3.3.

FIG. 2 is a plot of polarization resistance data versus R values for silicate solutions having a $SiO_2$ to $Na_2O$ ratio range of 1.0 to 3.3. FIG. 2 shows a significant maxima about 2.O R. The corrosion rate at this ratio is approximately 3 times lower than for the next closest data point (1.8 R).

Figure 3:
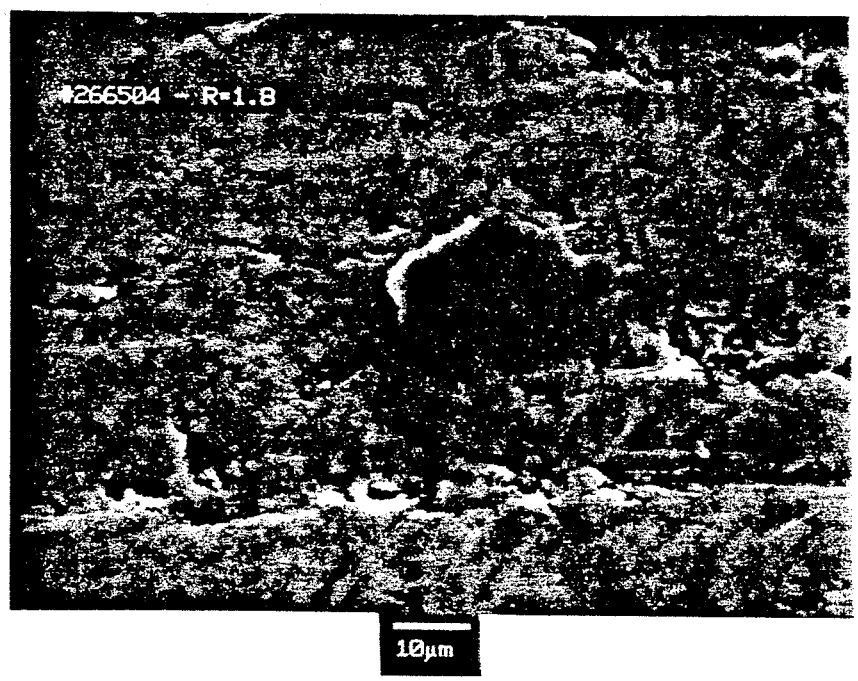
FIG. 3 is a scanning electron photomicrograph, magnification 1000×, of the 1.8 R exposed sample following Electrochemical Impedance Spectra (EIS) and $E_{corr}$ measurements.

FIG. 3 is a scanning electron photomicrograph, magnification 1000×, of the 1.8 R exposed sample of aluminum following EIS and $E_{corr}$ measurements. The surface of the sample is smooth and free of pits.

Figure 4:
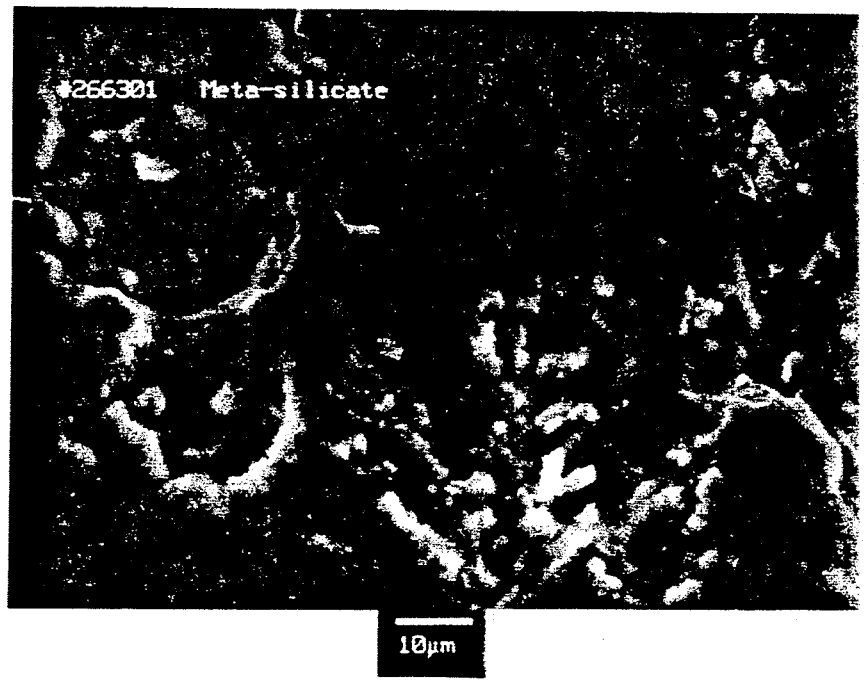
FIG. 4 is a scanning electron photomicrograph, magnification 1000×, of the 1.0 R exposed sample following Electrochemical Impedance Spectra (EIS) and $E_{corr}$ measurements.

FIG. 4 is a similar electron photomicrograph to that shown in FIG. 3, however, for R=1.0, the sample has open pits and surface roughness caused by corrosion. Both FIGS. 3 and 4 confirm the electrical measurements.

The $E_{corr}$ data, EIS and micrograph data demonstrate the effectiveness of a low ratio of $SiO_2$ to $Na_2O$ significantly reduces the corrosive effects on aluminum.

Thus, while the invention has been described in connection with what is presently considered to be the most practical and preferred embodiment, it is to be understood that the invention is not to be limited to the disclosed embodiment, but on the contrary, is intended to cover various modifications and equivalents included within the spirit and scope of the appended claims.

What is claimed is:

1. An aqueous corrosion-inhibiting automotive coolant solution consisting essentially of water and an anticorrosive effective amount of a sodium silicate which is present in an amount to yield between about 0.01 to about 0.2 wt % of silica based on the total solution weight, and having a ratio of silica to sodium oxide of between about 1.8 to 2.2.

2. A solution as in claim 1, wherein said sodium silicate corrosion inhibitor is present in an amount to yield between about 0.05 to about 0.06 wt. % of silica based on the total solution weight.

3. A solution as in claim 1 which further consists essentially of other organic or inorganic inhibitors in an amount up to about 1.5 wt % based on the total solution weight.

4. A solution as in claim 1, which further consists essentially of sodium phosphate.

5. A method of inhibiting the corrosion of an automotive cooling system which comprises forming an aqueous corrosion-inhibiting solution in water of the automotive cooling system such that said aqueous solution consists essentially of an anti-corrosive effective amount of a sodium silicate which is present in the solution in an amount to yield between about 0.01 to about 0.2 wt. % of silica based on the total solution weight, and having a ratio of silica to sodium oxide of between about 1.8 to 2.2.

6. A method as in claim 5, wherein said sodium silicate corrosion inhibitor is present in an amount to yield between about 0.05 to about 0.06 wt. % of silica based on the total solution weight.

7. A consists essentially of as in claim 5 which further contains other organic or inorganic inhibitors in an amount up to about 1.5 wt. % based on the total solution weight.

8. A consists essentially of as in claim 7, which further contains sodium phosphate.

* * * * *